United States Patent
Wu

(10) Patent No.: US 7,533,390 B2
(45) Date of Patent: May 12, 2009

(54) ELECTRONIC APPARATUS AND OPTICAL PICKUP HEAD TILTING ANGLE ADJUSTING MECHANISM THEREOF

(75) Inventor: Tsung-Lin Wu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 666 days.

(21) Appl. No.: 11/226,292

(22) Filed: Sep. 15, 2005

(65) Prior Publication Data

US 2006/0080690 A1 Apr. 13, 2006

(30) Foreign Application Priority Data

Sep. 30, 2004 (TW) .............................. 93129725 A

(51) Int. Cl.
*G11B 17/30* (2006.01)

(52) U.S. Cl. .................................................. 720/600
(58) Field of Classification Search .................. None
See application file for complete search history.

(56) References Cited

U.S. PATENT DOCUMENTS

| | | | | |
|---|---|---|---|---|
| 5,982,735 A * | 11/1999 | Tsai | ........................... | 720/675 |
| 6,874,154 B2 * | 3/2005 | Inoue et al. | .................. | 720/675 |
| 7,213,251 B2 * | 5/2007 | Park et al. | ..................... | 720/675 |
| 7,219,357 B2 * | 5/2007 | Furuya et al. | ................ | 720/675 |
| 7,328,443 B2 * | 2/2008 | Pan | ............................. | 720/674 |
| 2001/0005356 A1 * | 6/2001 | Park | ........................... | 369/255 |
| 2002/0136153 A1 * | 9/2002 | Saito et al. | ................... | 369/249 |
| 2004/0052199 A1 * | 3/2004 | Nakashima et al. | ......... | 369/249 |

* cited by examiner

*Primary Examiner*—Mark Blouin
(74) *Attorney, Agent, or Firm*—Birch, Stewart, Kolasch & Birch, LLP

(57) ABSTRACT

An electronic apparatus includes a base, a first adjusting member, a first guide rod, a second guide rod, and an optical pickup head. The first adjusting member has a first supporting part, and a first rotating axis. The first rotating axis is passed through the first supporting part. The distance between the periphery of the first supporting part and the first rotating axis gradually changes. The first adjusting member is pivoted to the base by the first rotating axis. At least one part of the first guide rod is disposed on the periphery of the first supporting part. At least one part of the second guide rod connects with the base. The optical pickup head is disposed both on the first guide rod and the second guide rod. An optical head tilting angle adjusting mechanism is provided in the electronic apparatus.

16 Claims, 5 Drawing Sheets

10

ELECTRONIC APPARATUS AND OPTICAL PICKUP HEAD TILTING ANGLE ADJUSTING MECHANISM THEREOF

BACKGROUND OF THE INVENTION

1. Field of Invention

The invention relates to an electronic apparatus and an optical pickup head adjusting mechanism thereof, and more particularly to an electronic apparatus with an optical pickup head and a tilting angle adjusting mechanism of the optical pickup head of the electronic apparatus.

2. Related Art

Recently, using an optical disk to record voices, images and personal file data has become the popular data storage method. With the large storage space of the optical disk and the property of the optical disk that is easily preserved, people can exchange information rapidly and get a lot of fun using the optical disk. The optical disk drive serving as a device for reading the optical disk has further become one of the indispensable products in the present computer peripheral apparatus.

In general, when the optical disk drive is reading data on the optical disk, the jitter of the radio frequency (RF) signal transmitted from the optical pickup head is directly proportional to the read error rate. The error rate gets larger as the jitter becomes larger, or even the reading may fail in a serious condition. If the laser beam reflected from the optical disk back to the optical pickup head has a better optical quality, the RF signal jitter may be suppressed. Thus, the optical axis (the emitted laser light path for reading/writing) of the optical pickup head has to be perpendicular to the surface of the optical disk as possible as it can such that the scattering and refracting loss of the laser beam during the reflecting procedure may be reduced.

In order to make the optical axis of the optical pickup head perpendicular to the surface of the optical disk as possible as it can, the conventional optical disk drive, especially the DVD optical disk drive that is more sensitive to the optical axis error, has an optical pickup head tilting angle adjusting mechanism 10, which includes a spindle motor 11, a disk loader 12 disposed on an upper edge of the spindle motor 11, and an optical pickup head 13 attached to a slidable base 14. A sled motor drives the slidable base 14 to move back and forth along guiding tracks 15, such that the optical pickup head 13 can be moved horizontally along the surface of the optical disk.

In order to keep the laser beam reflected from the surface of the optical disk and the laser beam emitted from the optical pickup head 13 vertically, the operator has to precisely adjust the height and tilting angle of the guiding track 15 such that the laser beam emitted from the optical pickup head 13 that is disposed on the guiding tracks 15 is parallel to the normal vector of the plane of the upper surface of the disk loader 12. Consequently, when the optical disk is placed on the disk loader 12, the laser light path of the optical pickup head 13 can cause the disk data to be precisely read or written.

However, the conventional optical pickup head tilting angle adjusting mechanism 10 is to rotate the screws 16 connected to the end portions of the guiding track 15 in order to change the heights of the supporting points of the guiding track 15. In addition, an elastic piece 17 is used to press the guiding track so that the tilting angle and height of the guiding track 15 may be adjusted. Consequently, the adjusting operation cannot be quantitated, and the reproducibility of the rotated screw 16 is not good such that the precision cannot be easily controlled, and the operator has to repeatedly adjust the screw. When automatic adjusting processes are to be performed, the feedback signals also have to be repeatedly identified, and a lot of time is thus wasted. Also, after the adjustment is completed, the glue has to be dispensed onto the screws 16 in order to fix the height of the adjusted guiding track 15 permanently.

It is therefore an important subjective of the invention to provide an electronic apparatus and an optical pickup head tilting angle adjusting mechanism thereof, which can solve the problems of quantification and precision control caused by manually adjusting the screws.

SUMMARY OF THE INVENTION

In view of the foregoing, the invention is to provide an electronic apparatus and an optical pickup head tilting angle adjusting mechanism in which the adjusting operation may be quantitated.

To achieve the above, an electronic apparatus of the invention includes a base, a first adjusting member, a first guide rod, a second guide rod and an optical pickup head. The first adjusting member has a first supporting part and a first rotating shaft passing through the first supporting part. A distance between a periphery of the first supporting part and the first rotating shaft is substantially gradually changed. The first adjusting member is pivoted to the base by the first rotating shaft. At least one part of the first guide rod is disposed on the periphery of the first supporting part. At least one part of the second guide rod connects with the base and is adjacent to the first guide rod. The optical pickup head is disposed on the first guide rod and the second guide rod.

To achieve the above, an optical pickup head tilting angle adjusting mechanism of the invention, which is for adjusting an optical pickup head, includes a base, a first adjusting member, a first guide rod and a second guide rod. The first adjusting member has a first supporting part and a first rotating shaft passing through the first supporting part. A distance between a periphery of the first supporting part and the first rotating shaft is substantially gradually changed. The first adjusting member is pivoted to the base by the first rotating shaft. At least one part of the first guide rod is disposed on the periphery of the first supporting part. At least one part of the second guide rod connects with the base and is adjacent to the first guide rod. The optical pickup head is disposed on the first guide rod and the second guide rod.

As mentioned above, the electronic apparatus of the invention and the optical pickup head tilting angle adjusting mechanism thereof have the first guide rod or second guide rod disposed on the adjusting member, wherein the distance between the periphery of the supporting part and the rotating shaft is substantially gradually changed. Thus, the operator can adjust the height of the first guide rod or the second guide rod with respect to the base by rotating the adjusting member such that the light ray outputted from the optical pickup head is perpendicular to the surface of the optical disk. Compared to the prior art, the periphery of the adjusting member or the gear coaxial with the adjusting member has sawteeth in the electronic apparatus of the invention and the optical pickup head tilting angle adjusting mechanism thereof. Thus, the operator can quantitate the height adjusting level of the guide rod by rotating the gear in a predetermined number of sawteeth. Furthermore, because the height adjusting level of the guide rod may be quantitated, the operator's adjusting speed may be increased, and the precision of the height of the guide rod may be enhanced. In addition, the reproducibility of the adjusting member is high, and the human error may be reduced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First, an electronic apparatus according to a preferred embodiment of the invention will be described with reference to FIGS. 2 to 4.

Figure 1:
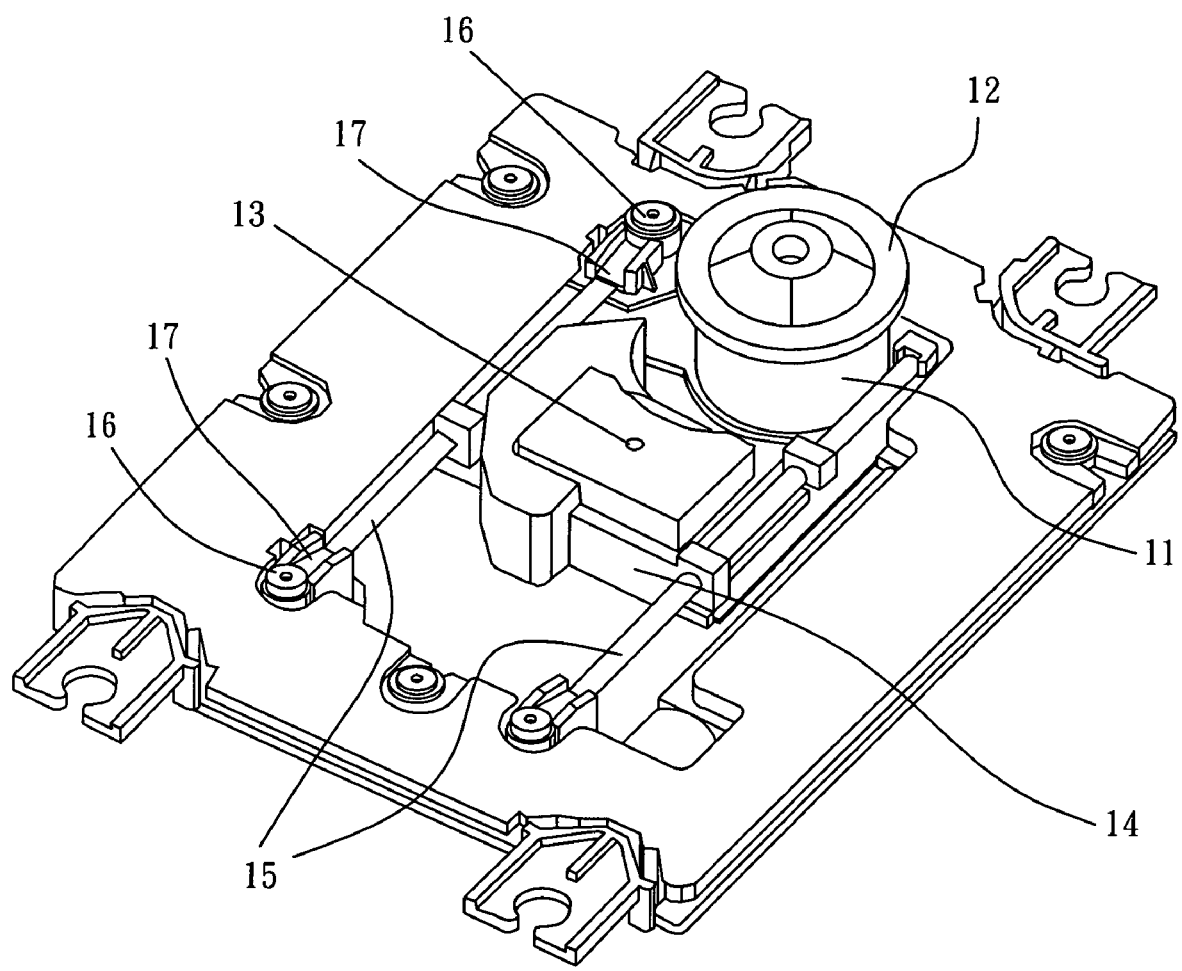
FIG. 1 is a schematic illustration showing a conventional optical pickup head tilting angle adjusting mechanism.
Figure 2:
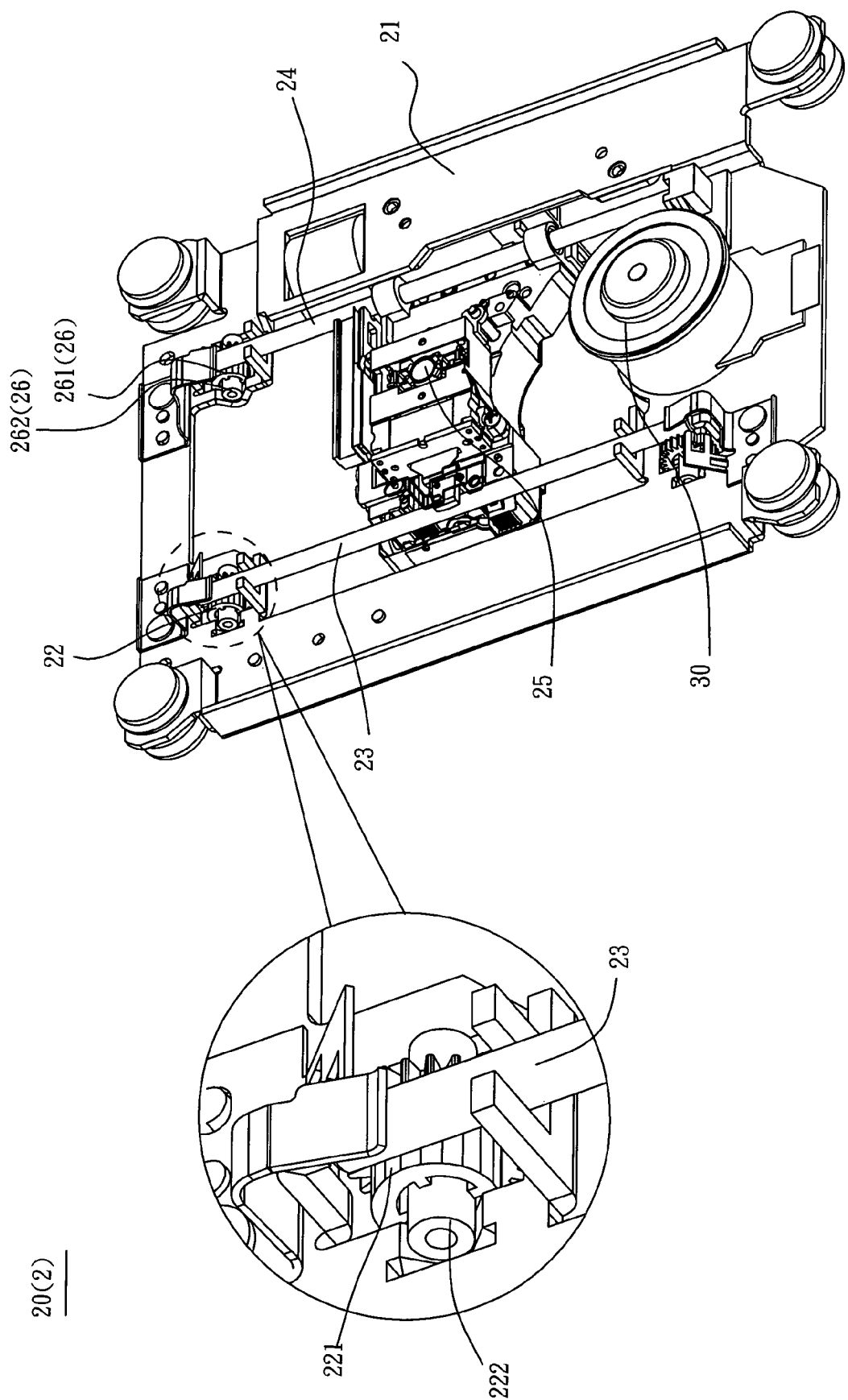
FIG. 2 is a schematic illustration showing an electronic apparatus and an optical pickup head tilting angle adjusting mechanism according to a preferred embodiment of the invention.

With reference to FIG. 2, an electronic apparatus 2 includes a base 21, a first adjusting member 22, a first guide rod 23, a second guide rod 24, and an optical pickup head 25. In this embodiment, the electronic apparatus 2 is an optical disk drive as an example.

As shown in FIG. 2, the first adjusting member 22 has a first supporting part 221 and a first rotating shaft 222. The first adjusting member 22 is pivoted to the base 21 by the first rotating shaft 222. In this embodiment, the electronic apparatus 2 having two first adjusting members 22 serves an example, and the first adjusting members 22 are respectively disposed at two ends of the first guide rod 23. Of course, the number of the first adjusting members 22 also may be determined according to the actual requirement.

Figure 3:
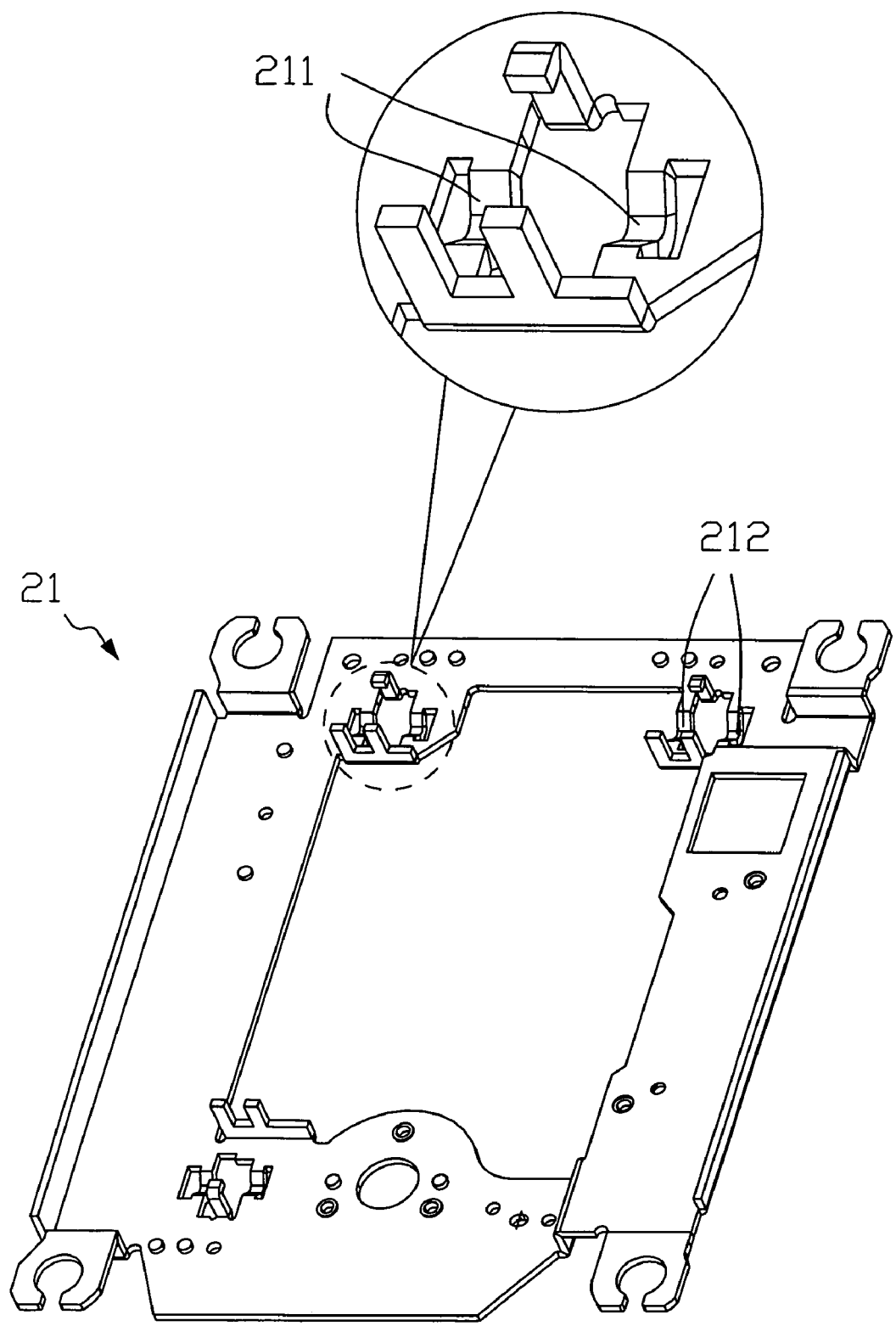
FIG. 3 is a schematic illustration showing a base of the electronic apparatus and the optical pickup head tilting angle adjusting mechanism thereof according to the preferred embodiment of the invention.

Referring to FIGS. 2 and 3, the base 21 has at least one first concave portion 211, in which the first rotating shaft 222 is disposed.

Figure 4:
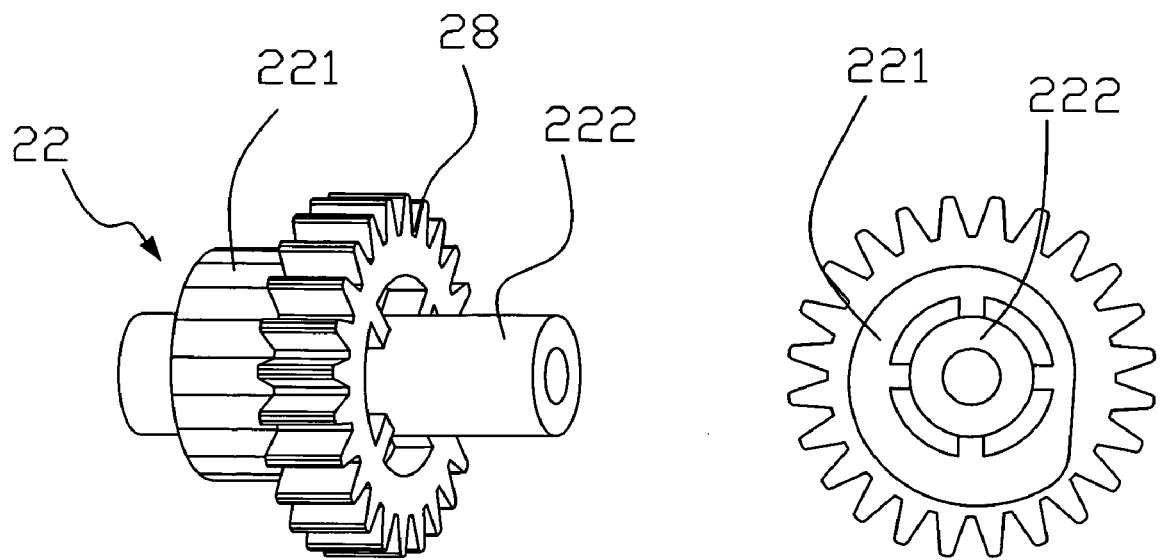
FIG. 4 is a schematic illustration showing a first adjusting member and a first gear of the electronic apparatus and the optical pickup head tilting angle adjusting mechanism according to the preferred embodiment of the invention.

With reference to FIG. 4, the first rotating shaft 222 passes through the first supporting part 221. A distance between a periphery of the first supporting part 221 and the first rotating shaft 222 is substantially gradually changed. The first supporting part 221 is a ring-shaped member.

Figure 5:
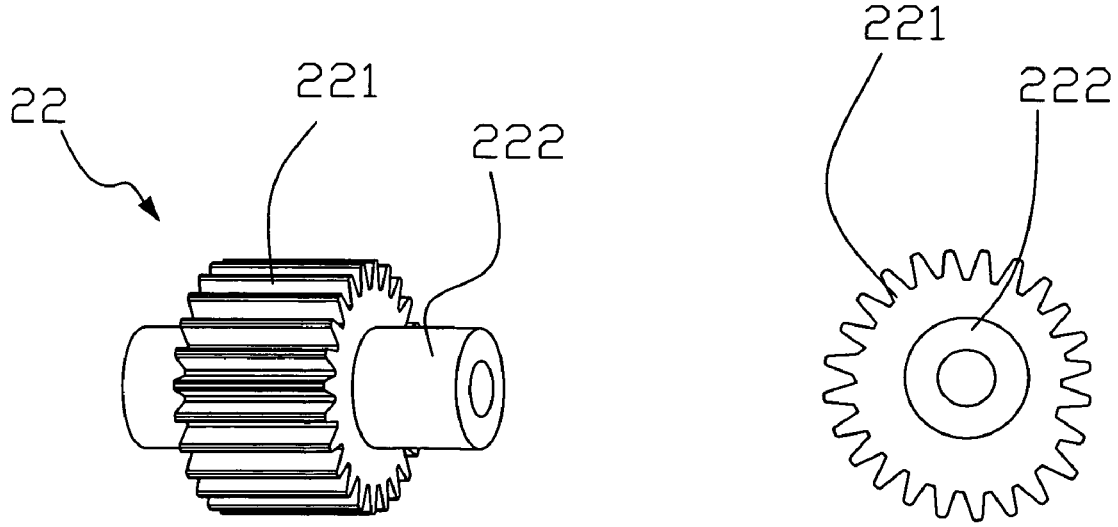
FIG. 5 is a schematic illustration showing another first adjusting member of the electronic apparatus and the optical pickup head tilting angle adjusting mechanism according to the preferred embodiment of the invention.

In addition, as shown in FIGS. 2 and 5, the first supporting part 221 may have a plurality of sawteeth, and one end of the first guide rod 23 may be directly disposed on the sawtooth of the first supporting part 221.

Please refer to FIG. 2 again. At least one part of the first guide rod 23 is disposed on the periphery of the first supporting part 221. Thus, when the first adjusting member 22 rotates about the first rotating shaft 222, the height of the first guide rod 23 disposed on first supporting part 221 with respect to the base is changed with the change of the distance between the periphery of the first supporting part 221 and the first rotating shaft 222.

At least one part of the second guide rod 24 connects with the base 21 and is adjacent to the first guide rod 23.

In this embodiment, the electronic apparatus 2 further includes at least one second adjusting member 26, which has a second supporting part 261 and a second rotating shaft 262. The second rotating shaft 262 passes through the second supporting part 261, and a distance between a periphery of the second supporting part 261 and the second rotating shaft 262 is substantially gradually changed. The second supporting part 261 can be a ring-shaped member, and may have a plurality of sawteeth. Herein, the functions and features of the second adjusting member 26 are the same as those of the first adjusting member 22, so the detailed descriptions are omitted for concise purpose.

As shown in FIGS. 2 and 3, at least one part of the second guide rod 24 is disposed on the periphery of the second supporting part 261. The second adjusting member 26 is pivoted to the base 21 by the second rotating shaft 262. The base 21 has at least one second concave portion 212, in which the second rotating shaft 262 is disposed.

Figure 6:
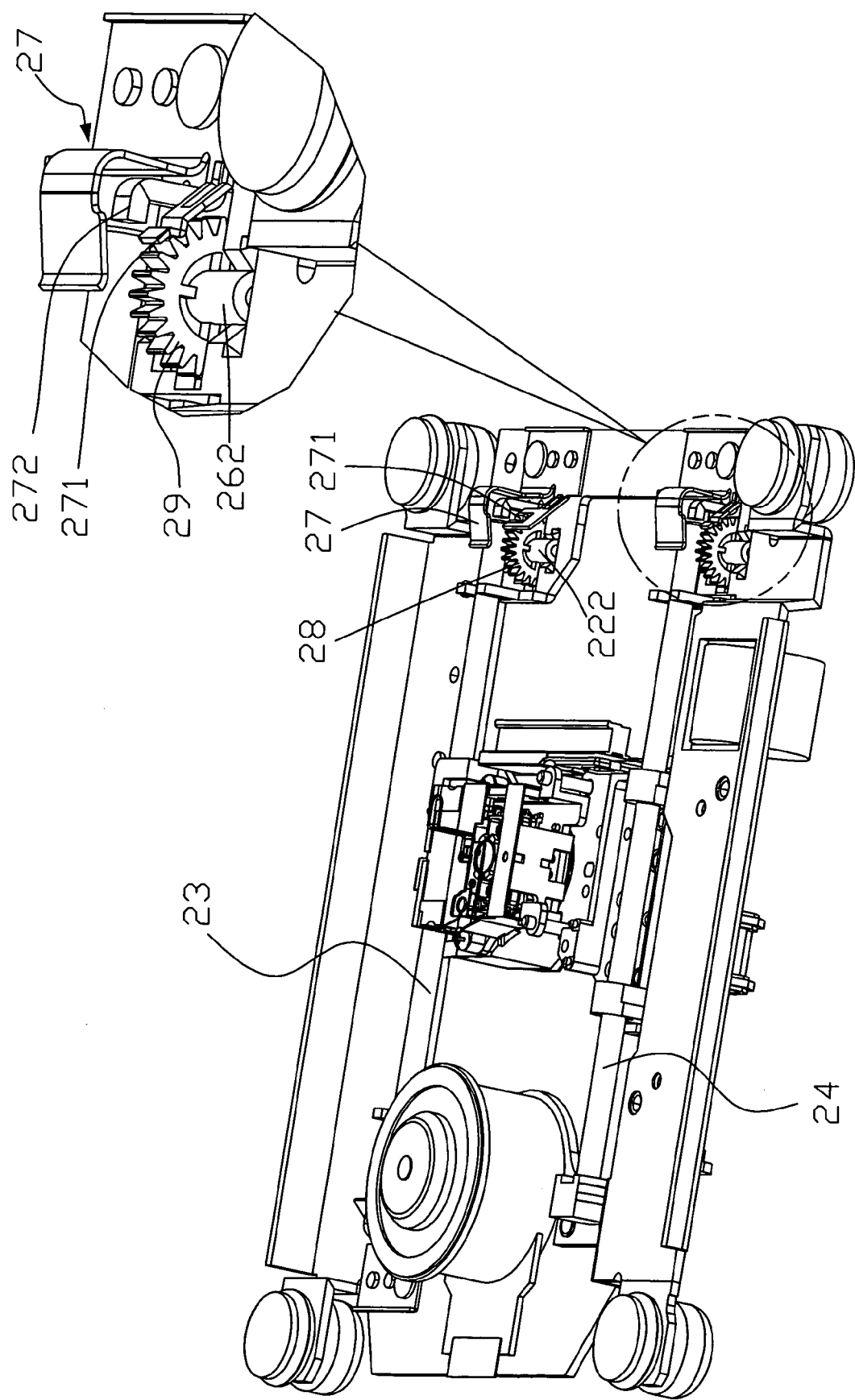
FIG. 6 is a schematic illustration showing another electronic apparatus and the optical pickup head tilting angle adjusting mechanism thereof according to the preferred embodiment of the invention.

Referring to FIG. 2 and FIG. 6, the electronic apparatus 2 of the embodiment further includes at least one elastic piece 27 having one side disposed on the base 21 and the other side in contact with a portion of the first guide rod 23 or the second guide rod 24, such that the first guide rod 23 or the second guide rod 24 is attached to the first supporting part 221 or the second supporting part 261.

As shown in FIGS. 2 and 6, the elastic piece 27 of this embodiment may further include at least one engagement portion 271, and the electronic apparatus 2 further includes at least one first gear 28. The first gear 28 passes through the first rotating shaft 222 and can be rotated in synchronization with the first supporting part 221. The engagement portion 271 engages with the sawtooth of the first gear 28 so as to prevent the first adjusting member 22 to deviate from the desired position after the adjustment is finished.

In addition, the electronic apparatus 2 further includes at least one second gear 29, which passes through the second rotating shaft 262 and is rotated in synchronization with the second supporting part 261. The engagement portion 271 engages with the sawtooth of the second gear 29.

With reference to FIG. 2 and FIG. 6, the electronic apparatus 2 of the embodiment further includes a plurality of stoppers 272 disposed on the base 21. The stoppers 272 restrict the axial movement of the first guide rod 23 or the second guide rod 24.

The optical pickup head 25 is disposed on the first guide rod 23 and the second guide rod 24, and the optical pickup head 25 slides on the first guide rod 23 and the second guide rod 24. In this embodiment, two ends of the first guide rod 23 are respectively disposed on the first adjusting member 22. The second guide rod 24 has one end fixed to the base 21.

Please refer to FIG. 2 again. When an operator starts to adjust the tilting angle of the optical pickup head 25, the heights of the first guide rod 23 and the second guide rod 24 are adjusted in conjunction with the measured jitter of the optical pickup head 25. First, the first adjusting member 22 farther from a spindle motor 30 on the first guide rod 23 is adjusted such that the first guide rod 23 is parallel to the second guide rod 24. The operator can use his/her finger to actuate the first adjusting member 22 or use the gear driven by a motor to rotate the first adjusting member 22. Rotating the sawtooth on the periphery of the first supporting part 221 or the sawtooth of the first gear 28 can quantitate the height adjusting level of the first guide rod 23. Next, the first adjusting member 22 away from the spindle motor 30 and the second adjusting member 26 are again synchronously adjusted. That is, the number of sawteeth of the first adjusting member 22 that has been adjusted equals the number of sawteeth of the second adjusting member 26 that should be adjusted. Thus, the plane formed by the first guide rod 23 and the second guide rod 24 is parallel to the radial component of the plane of the optical disk placed on the spindle motor 30. Finally, the first adjusting members 22 at two ends of the first guide rod 23 are synchronously adjusted such that the plane formed by the first guide rod 23 and the second guide rod 24 is parallel to the tangential direction component of the plane of the optical disk. As a result, the adjustment of the tilting angle of the optical pickup head may be completed such that the light ray emitted from the optical pickup head 25 is indeed perpendicular to the plane of the optical disk. In addition, because the first adjusting member 22 and the second adjusting member 26 have the positioning functions due to the clamping effect of the elastic piece, the adjusted status does not have to be fixed by way of glue dispensing.

Next, an optical pickup head tilting angle adjusting mechanism according to the preferred embodiment of the invention will be described again with reference to FIGS. 2 to 6.

Referring to FIG. 2, the optical pickup head tilting angle adjusting mechanism 20 includes a base 21, a first adjusting member 22, a first guide rod 23, and a second guide rod 24. The optical pickup head tilting angle adjusting mechanism 20 is for adjusting an optical pickup head 25. In this embodiment, the optical pickup head tilting angle adjusting mechanism 20 is an optical pickup head tilting angle adjusting mechanism in an optical disk drive as an example.

As shown in FIG. 2, the first adjusting member 22 has a first supporting part 221 and a first rotating shaft 222. The first adjusting member 22 is pivoted to the base 21 by the first rotating shaft 222. In this embodiment, the optical pickup head tilting angle adjusting mechanism 20 having two first adjusting members 22 serves as an example, and the first adjusting members 22 are respectively disposed at two ends of the first guide rod 23. Of course, the number of the first adjusting members 22 also may be determined according to the actual requirement.

Referring to FIGS. 2 and 3, the base 21 has at least one first concave portion 211, in which the first rotating shaft 222 is disposed.

With reference to FIG. 4, the first rotating shaft 222 passes through the first supporting part 221. A distance between a periphery of the first supporting part 221 and the first rotating shaft 222 is substantially gradually changed. The first supporting part 221 is a ring-shaped member.

In addition, as shown in FIGS. 2 and 5, the first supporting part 221 may have a plurality of sawteeth, and one end of the first guide rod 23 may be directly disposed on the sawtooth of the first supporting part 221.

Please refer to FIG. 2 again. At least one part of the first guide rod 23 is disposed on the periphery of the first supporting part 221. Thus, when the first adjusting member 22 rotates about the first rotating shaft 222, the height of the first guide rod 23 disposed on first supporting part 221 with respect to the base is changed with the change of the distance between the periphery of the first supporting part 221 and the first rotating shaft 222.

At least one part of the second guide rod 24 connects with the base 21 and is adjacent to the first guide rod 23.

In this embodiment, the optical pickup head tilting angle adjusting mechanism 20 further includes at least one second adjusting member 26, which has a second supporting part 261 and a second rotating shaft 262. The second rotating shaft 262 passes through the second supporting part 261, and a distance between a periphery of the second supporting part 261 and the second rotating shaft 262 is substantially gradually changed. The second supporting part 261 can be a ring-shaped member, and may have a plurality of sawteeth. Herein, the functions and features of the second adjusting member 26 are the same as those of the first adjusting member 22, so the detailed descriptions are omitted for concise purpose.

As shown in FIGS. 2 and 3, at least one part of the second guide rod 24 is disposed on the periphery of the second supporting part 261. The second adjusting member 26 is pivoted to the base 21 by the second rotating shaft 262. The base 21 has at least one second concave portion 212, in which the second rotating shaft 262 is disposed.

Referring to FIG. 2 and FIG. 6, the optical pickup head tilting angle adjusting mechanism 20 of the embodiment further includes at least one elastic piece 27 having one side disposed on the base 21 and the other side in contact with a portion of the first guide rod 23 or the second guide rod 24, such that the first guide rod 23 or the second guide rod 24 is attached to the first supporting part 221 or the second supporting part 261.

As shown in FIGS. 2 and 6, the elastic piece 27 of this embodiment may further include at least one engagement portion 271, and the optical pickup head tilting angle adjusting mechanism 20 further includes at least one first gear 28. The first gear 28 passes through the first rotating shaft 222 and can be rotated in synchronization with the first supporting part 221. The engagement portion 271 engages with the sawtooth of the first gear 28 so as to prevent the first adjusting member 22 to deviate from the desired position after the adjustment is finished.

In addition, the optical pickup head tilting angle adjusting mechanism 20 further includes at least one second gear 29, which passes through the second rotating shaft 262 and is rotated in synchronization with the second supporting part 261. The engagement portion 271 engages with the sawtooth of the second gear 29.

With reference to FIG. 2 and FIG. 6, the optical pickup head tilting angle adjusting mechanism 20 of the embodiment further includes a plurality of stoppers 272 disposed on the base 21. The stoppers 272 restrict the axial movement of the first guide rod 23 or the second guide rod 24.

The optical pickup head 25 is disposed on the first guide rod 23 and the second guide rod 24, and the optical pickup head 25 slides on the first guide rod 23 and the second guide rod 24. In this embodiment, two ends of the first guide rod 23 are respectively disposed on the first adjusting member 22. The second guide rod 24 has one end fixed to the base 21.

Please refer to FIG. 2 again. When an operator starts to adjust the tilting angle of the optical pickup head 25, the heights of the first guide rod 23 and the second guide rod 24 are adjusted in conjunction with the measured jitter of the optical pickup head 25. First, the first adjusting member 22 farther from a spindle motor 30 on the first guide rod 23 is adjusted such that the first guide rod 23 is parallel to the second guide rod 24. The operator can use his/her finger to actuate the first adjusting member 22 or use the gear driven by a motor to rotate the first adjusting member 22. Rotating the sawtooth on the periphery of the first supporting part 221 or the sawtooth of the first gear 28 can quantitate the height adjusting level of the first guide rod 23. Next, the first adjusting member 22 away from the spindle motor 30 and the second adjusting member 26 are again synchronously adjusted. That is, the number of sawteeth of the first adjusting member 22 has been adjusted equals that the second adjusting member 26 has been adjusted. Thus, the plane formed by the first guide rod 23 and the second guide rod 24 is parallel to the radial component of the plane of the optical disk placed on the spindle motor 30. Finally, the first adjusting members 22 at two ends of the first guide rod 23 are synchronously adjusted such that the plane formed by the first guide rod 23 and the second guide rod 24 is parallel to the tangential direction component of the plane of the optical disk. As a result, the adjustment of the tilting angle of the optical pickup head may be completed such that the light ray emitted from the optical pickup head 25 is indeed perpendicular to the plane of the optical disk. In addition, because the first adjusting member 22 and the second adjusting member 26 can provide friction force by themselves, the adjusted status does not have to be fixed by way of glue dispensing.

In brief, the electronic apparatus of the invention and the optical pickup head tilting angle adjusting mechanism thereof have the first guide rod or second guide rod disposed on the adjusting member, wherein the distance between the periphery of the supporting part and the rotating shaft is substantially gradually changed. Thus, the operator can adjust the height of the first guide rod or the second guide rod with respect to the base by rotating the adjusting member such that the light ray outputted from the optical pickup head is perpendicular to the surface of the optical disk. Compared to the prior art, the periphery of the adjusting member or the gear coaxial with the adjusting member has sawteeth in the electronic apparatus of the invention and the optical pickup head tilting angle adjusting mechanism thereof. Thus, the operator can quantitate the height adjusting level of the guide rod by rotating the gear in a predetermined number of sawteeth. Furthermore, because the height adjusting level of the guide rod may be quantitated, the operator's adjusting speed may be increased, and the precision of the height of the guide rod may be enhanced. In addition, the reproducibility of the adjusting member is high, and the human error may be reduced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical pickup head tilting angle adjusting mechanism for adjusting an optical pickup head, comprising:
   a base;
   a first adjusting member having a first supporting part and a first rotating shaft, wherein the first rotating shaft passes through the first supporting part, a distance between a periphery of the first supporting part and the first rotating shaft is substantially gradually changed, and the first adjusting member is pivoted to the base by the first rotating shaft;
   a first guide rod having at least a part disposed on the periphery of the first supporting part;
   a second guide rod having at least a part connecting to the base, wherein the optical pickup head is disposed on the first guide rod and the second guide rod;
   at least an engagement piece disposed on the base; and
   at least a first gear passing through the first rotating shaft and rotated in synchronization with the first supporting part, wherein the engagement piece is engaged with a sawtooth of the first gear.

2. The adjusting mechanism according to claim 1, further comprising at least a second adjusting member having a second rotating shaft and a second supporting part, wherein the second rotating shaft passes through the second supporting part, a distance between a periphery of the second supporting part and the second rotating shaft is substantially gradually changed, at least a part of the second guide rod is disposed on the periphery of the second supporting part, and the second adjusting member is pivoted to the base by the second rotating shaft.

3. The adjusting mechanism according to claim 1, further comprising at least an elastic piece, wherein the elastic piece has one side disposed on the base, and the other side in contact with a portion of the first guide rod or the second guide rod.

4. The adjusting mechanism according to claim 1, wherein the base has at least a first concave portion, and the first rotating shaft is disposed in the first concave portion.

5. The adjusting mechanism according to claim 2, wherein the base has at least a second concave portion, and the second rotating shaft is disposed in the second concave portion.

6. The adjusting mechanism according to claim 2, further comprising at least a second gear passing through the second rotating shaft and rotated in synchronization with the second supporting part, wherein the engagement piece is engaged with a sawtooth of the second gear.

7. The adjusting mechanism according to claim 1, further comprising a plurality of stoppers disposed on the base, wherein the stoppers restrict an axial movement of the first guide rod or the second guide rod.

8. An electronic apparatus, comprising:
   a base;
   a first adjusting member having a first supporting part and a first rotating shaft, wherein the first rotating shaft passes through the first supporting part, a distance between a periphery of the first supporting part and the first rotating shaft is substantially gradually changed, and the first adjusting member is pivoted to the base by the first rotating shaft;
   a first guide rod having at least a part disposed on the periphery of the first supporting part;
   a second guide rod having at least a part connecting to the base;
   an optical pickup head disposed on the first guide rod and the second guide rod; and
   at least a first gear passing through the first rotating shaft and rotated in synchronization with the first supporting part.

9. The electronic apparatus according to claim 8, further comprising at least a second adjusting member having a second rotating shaft and a second supporting part, wherein the second rotating shaft passes through the second supporting part, a distance between a periphery of the second supporting part and the second rotating shaft is substantially gradually changed, at least a part of the second guide rod is disposed on the periphery of the second supporting part, and the second adjusting member is pivoted to the base by the second rotating shaft.

10. The electronic apparatus according to claim 8, further comprising at least an elastic piece, wherein the elastic piece has one side disposed on the base, and the other side in contact with a portion of the first guide rod or the second guide rod.

11. The electronic apparatus according to claim 8, wherein the base has at least a first concave portion, and the first rotating shaft is disposed in the first concave portion.

12. The electronic apparatus according to claim 9, wherein the base has at least a second concave portion, and the second rotating shaft is disposed in the second concave portion.

13. The electronic apparatus according to claim 9, further comprising at least a second gear passing through the second rotating shaft and rotated in synchronization with the second supporting part.

14. The electronic apparatus according to claim 8, further comprising at least an engagement piece disposed on the base and having a projection to be engaged with a sawtooth of the first gear.

15. The electronic apparatus according to claim 13, further comprising at least an engagement piece disposed on the base and having a projection to be engaged with a sawtooth of the second gear.

16. The electronic apparatus according to claim 8, further comprising a plurality of stoppers disposed on the base, wherein the stoppers restrict an axial movement of the first guide rod or the second guide rod.

* * * * *